US011314925B1

(12) United States Patent
Sawaf et al.

(10) Patent No.: US 11,314,925 B1
(45) Date of Patent: Apr. 26, 2022

(54) CONTROLLING THE DISPLAY OF DIACRITIC MARKS

(71) Applicant: Saudi Arabian Oil Company, Dhahran (SA)

(72) Inventors: Khaled Sawaf, New York, NY (US); Sheikah Alshaihah, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/077,940

(22) Filed: Oct. 22, 2020

(51) Int. Cl.
*G06F 40/109* (2020.01)
*G06F 3/0482* (2013.01)

(52) U.S. Cl.
CPC .......... *G06F 40/109* (2020.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 4,603,330 A * | 7/1986 | Horne | ....................... | G09G 5/22 345/467 |
| 5,182,709 A * | 1/1993 | Makus | .................. | G06F 40/123 704/9 |
| 5,416,898 A * | 5/1995 | Opstad | .................. | G06F 40/189 345/468 |
| 6,882,344 B1 * | 4/2005 | Hayes | ....................... | G09G 5/24 345/467 |
| 7,453,439 B1 * | 11/2008 | Kushler | ................ | G06F 3/0237 345/168 |
| 7,991,153 B1 | 8/2011 | Rao et al. | | |
| 8,543,382 B2 * | 9/2013 | Khorsheed | ............ | G06F 40/232 704/9 |
| 8,726,148 B1 * | 5/2014 | Battilana | ............... | G06F 40/274 715/234 |
| 8,902,170 B2 | 12/2014 | Pasquero et al. | | |
| 9,298,277 B1 * | 3/2016 | Alsabah | ................ | G06F 3/0219 |
| 9,436,291 B2 * | 9/2016 | Khan | .................. | G06F 3/04886 |
| 9,529,449 B1 * | 12/2016 | Chen | ..................... | G06F 3/0233 |
| 10,019,415 B1 * | 7/2018 | Wombell | ............. | G06F 40/106 |

(Continued)

OTHER PUBLICATIONS

Adnan Gutub; Utilizing Diacritic Marks for Arabic Text Steganography; Jun. 2010Kuwait Journal of Science & Engineering 37(1):89-109; https://www.researchgate.net/publication/228388567_Utilizing_Diacritic_Marks_for_Arabic_Text_Steganography (Year: 2010).*

(Continued)

*Primary Examiner* — Benjamin Smith
(74) *Attorney, Agent, or Firm* — Fish & Richardson P.C.

(57) ABSTRACT

Disclosed are methods, systems, and computer-readable medium to perform operations including: generating a plurality of character glyphs of a language that uses diacritic marks; generating a plurality of diacritic mark glyphs of the diacritic marks of the language; anchoring the plurality of diacritic mark glyphs to the plurality of character glyphs to create a set of glyphs for the language; creating, based on the set of glyphs, a duplicate set of glyphs comprising a plurality of duplicate character glyphs and a plurality of duplicate diacritic mark glyphs; editing at least one of the plurality of duplicate diacritic mark glyphs to remove visual appearance capability; designating the set of glyphs as a diacritics reveal font and the edited duplicate set of glyphs as a diacritics conceal font; and providing the diacritics reveal font and the diacritics conceal font for output on a graphical user interface (GUI) displayed on a display device.

12 Claims, 9 Drawing Sheets

(56) References Cited

U.S. PATENT DOCUMENTS

| | | | | |
|---|---|---|---|---|
| 10,234,958 | B2* | 3/2019 | Chen | G06F 40/129 |
| 2004/0257301 | A1* | 12/2004 | Ari | B42D 19/005 345/30 |
| 2006/0100848 | A1* | 5/2006 | Cozzi | G06F 40/129 704/5 |
| 2006/0132812 | A1* | 6/2006 | Barnes | G06F 40/106 358/1.11 |
| 2007/0040813 | A1* | 2/2007 | Kushler | G06F 3/04883 345/173 |
| 2007/0262991 | A1* | 11/2007 | Abulhab | G06T 11/203 345/467 |
| 2008/0030502 | A1 | 2/2008 | Chapman | |
| 2008/0276166 | A1* | 11/2008 | Wang-Aryattanwanich | G06F 40/109 715/264 |
| 2008/0300861 | A1* | 12/2008 | Emam | G06F 40/129 704/8 |
| 2008/0301431 | A1 | 12/2008 | Hea | |
| 2012/0109633 | A1* | 5/2012 | Khorsheed | G06F 40/232 704/8 |
| 2013/0271382 | A1* | 10/2013 | Khan | G06F 3/04886 345/171 |
| 2014/0115452 | A1* | 4/2014 | Rudolph | G06K 9/6828 715/256 |
| 2014/0380169 | A1* | 12/2014 | Eldawy | G06F 3/167 715/728 |
| 2017/0010860 | A1* | 1/2017 | Henniger | G06F 3/167 |
| 2017/0017854 | A1* | 1/2017 | You | G06K 9/00879 |
| 2017/0102780 | A1* | 4/2017 | Chen | G06F 40/232 |

OTHER PUBLICATIONS

Design With FontForge A Book About How To Create New Typefaces Using FontForge: Diacritics and Accents, Sep. 28, 2020, 9 pages, http://designwithfontforge.com/en-US/Diacritics_and_Accents.html, https://web.archive.org/web/20200628033344/http://designwithfontforge.com/en-US/Diacritics_and_Accents.html (Year: 2020).*

W3C; G163: Using standard diacritical marks that can be turned off; Jul. 20, 2017, 2 pages; https://www.w3.org/TR/2008/NOTE-WCAG20-TECHS-20081211/G163; https://web.archive.org/web/20170720050654/https://www.w3.org/TR/2008/NOTE-WCAG20-TECHS-20081211/G163 (Year: 2017).*

RoboFont Documentation: Introduction to accented glyphs; Feb. 6, 2020; 3 pages; https://robofont.com/documentation/how-tos/introduction-to-accented-glyphs/ ; https://web.archive.org/web/20200921183156/https://robofont.com/documentation/how-tos/introduction-to-accented-glyphs/ (Year: 2020).*

DCODE: Diacritics Obfuscation; 2020; 2 pages; https://www.dcode.fr/diacritics-obfuscation (Year: 2020).*

Maamouri, Mohamed & Zaghouani, Wajdi & Cavalli-Sforza, Violetta & Graff, Dave & Ciul, Mike; Developing ARET: an NLP-based educational tool set for Arabic reading enhancement; Jun. 2012 Conference: https://aclanthology.org/W12-2015.pdf; 127-135. (Year: 2012).*

Baawi et al. "Improvement of 'Text Steganography Based on Unicode of Characters in Multilingual' by Custom Font with Special Properties," 2020 IOP Conference Series: Materials Science and Engineering, 870:012125, 2020, 12 pages.

Blatner, "Scramble Text in Place to Hide Private Info," retrieved from URL <http://indesignsecrets.com/scramble-text-place-hide-private-info.php>, Nov. 11, 2014, 8 pages.

textmechanic.com [online], "Word Scrambler/Descrambler," retrieved from URL <http://textmechanic.com/text-tools/obfuscation-tools/word-scramblerunscrambler/>, retrieved on Sep. 21, 2020, available on or before 2015, 2 pages.

* cited by examiner

CONTROLLING THE DISPLAY OF DIACRITIC MARKS

TECHNICAL FIELD

This disclosure relates to methods and systems for controlling the display of diacritic marks, for example, on a graphical user interface.

BACKGROUND

The writing systems of some languages use diacritic marks (for example, accents) that can be added to letters (for example, above or below the letters). These diacritic marks serve different functions, such as vowel pointing (for example, in Arabic and Hebrew) and changing the sound-values of the letters to which they are added (for example, in Latin script).

SUMMARY

In computer software, such as text editors, diacritic marks are treated as characters independent from the letters to which they are appended. Thus, diacritic marks are added or removed independently from their associated letters. One issue with designating diacritic marks as characters arises when a user of the software wishes to use or view the text without diacritic marks (for example, if the diacritic marks are deemed unnecessary or distracting). In this scenario, the user can only remove the diacritic marks by going through the text letter-by-letter and removing each mark from each letter. This process is time-consuming and can lead to unnecessary errors.

This disclosure describes methods and systems that enable toggling between a text view in which diacritic marks are displayed and a text view in which diacritic marks are hidden. In an embodiment, a font system generates respective fonts for revealing and concealing diacritic marks. The fonts are then output on a user interface. Selection of a reveal font for a text displays the diacritic marks associated with that text. Conversely, selection of a conceal font for the text suppresses the diacritic marks associated with the text. Thus, the font system provides users with the ability to instantly suppress all unnecessary diacritic marks. The conceal and reveal fonts do not affect the underlying text, and thus, users can switch between the fonts in order to toggle between a text view in which diacritic marks are displayed and a text view in which diacritic marks are hidden. In some examples, the font system can be configured to allow certain diacritic marks (for example, diacritic marks required for grammar) to appear in both conceal and reveal fonts.

In one aspect, the subject matter described in this specification may be embodied in methods that include the actions of: generating a plurality of character glyphs of a language that uses diacritic marks; generating a plurality of diacritic mark glyphs of the diacritic marks of the language; anchoring the plurality of diacritic mark glyphs to the plurality of character glyphs to create a set of glyphs for the language; creating, based on the set of glyphs, a duplicate set of glyphs comprising a plurality of duplicate character glyphs and a plurality of duplicate diacritic mark glyphs; editing at least one of the plurality of duplicate diacritic mark glyphs to remove visual appearance capability; designating the set of glyphs as a diacritics reveal font and the edited duplicate set of glyphs as a diacritics conceal font; and providing the diacritics reveal font and the diacritics conceal font for output on a graphical user interface (GUI) displayed on a display device.

The previously-described implementation is applicable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the method further involves generating a plurality of font weight styles for at least one of the diacritics reveal font and the diacritics conceal font; and providing the plurality of font weight styles for output on the GUI.

In some implementations, the method further involves coding respective names for each of the diacritics reveal font and the diacritics conceal font.

In some implementations, the GUI includes a font menu that includes the respective names of the diacritics reveal font and the diacritics conceal font.

In some implementations, the method further involves receiving a user input indicating selection of one of the diacritics reveal font and the diacritics conceal font for a text displayed on the GUI, where the text includes diacritic marks.

In some implementations, the selection is of the diacritics conceal font, and the display of the diacritic marks of the text are suppressed on the GUI.

In some implementations, the selection is of the diacritics conceal font, the user input is a first user input, and the method further involves receiving a second user input indicating selection of the diacritics reveal font, where the diacritic marks of the text are revealed on the GUI.

In some implementations, editing at least one of the plurality of duplicate diacritic mark glyphs to remove visual appearance capability involves editing code of source files of the plurality of duplicate diacritic mark glyphs to remove visual appearance capability.

In some implementations, editing at least one of the plurality of duplicate diacritic mark glyphs to remove visual appearance capability involves identifying at least one diacritic mark that is preconfigured to appear in both the diacritics reveal font and the diacritics conceal font; and editing the plurality of duplicate diacritic mark glyphs other than the diacritic mark glyphs that are associated with the at least one diacritic mark that is preconfigured to appear in both the diacritics reveal font and the diacritics conceal font.

In another aspect, the subject matter described in this specification may be embodied in methods that include the actions of: providing a representation of a diacritics conceal feature for output on a graphical user interface (GUI) displayed on a display device; receiving a user input indicating selection of the diacritics conceal feature for a text displayed on the GUI, where the text includes diacritic marks; and in response to receiving the user input, changing a stylistic configuration of the text, where the diacritic marks of the text are concealed from the GUI after the stylistic configuration of the text is changed.

The previously-described implementation is applicable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the diacritics conceal feature is a diacritics conceal font, and the stylistic configuration of the text is a font of the text.

In some implementations, the diacritics conceal feature is a diacritics conceal stylistic set, and the stylistic configuration of the text is a stylistic set of a font of the text.

In some implementations, the user input is a first user input, and the method further involves: receiving a second user input indicating selection of a diacritics reveal feature for the text displayed on the GUI; and in response to receiving the second user input, changing the stylistic configuration of the text, where the diacritic marks of the text are displayed on the GUI after the stylistic configuration of the text is changed.

In some implementations, the GUI includes a font menu that includes a representation of a diacritics reveal font and a diacritics conceal font.

In some implementations, the GUI includes a menu that includes a representation of a diacritics conceal stylistic set.

The subject matter described in this specification can be implemented to realize one or more of the following advantages. The disclosed font system provides an alternative to controlling the diacritic marks of a text letter-by-letter. Specifically, the disclosed font system enables non-destructive toggling between a text view in which diacritic marks are displayed and a text view in which diacritic marks are hidden. As such, the disclosed system eliminates unintended errors that result from controlling the diacritic marks of a text letter-by-letter. Additionally, the font system improves the efficiency of resources, such as time and processing power, by eliminating the need to control the diacritic marks of a text letter-by-letter.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes a font system that enables toggling between a text view in which diacritic marks are displayed on a graphical user interface (GUI) and a text view in which diacritic marks are hidden. In an embodiment, the font system develops respective fonts for displaying and concealing diacritic marks. The font system provides the generated fonts to a user interface (for example, of a text editing software). Selection of a reveal font for a text displays the diacritic marks associated with that text. Conversely, selection of a conceal font for the text suppresses the diacritic marks associated with that text. Thus, the font system provides users with the ability to instantly suppress all unnecessary diacritic marks for a simpler text view. The conceal and reveal fonts do not affect the underlying text, and thus, users can switch between the fonts as needed. In some examples, the font system can be configured to allow certain diacritic marks (for example, diacritic marks required for grammar) to appear in both conceal and reveal fonts. Note that although the examples given in this disclosure are in Arabic, the disclosed systems and methods can be applied to any language whose writing system uses diacritic marks, such as Hebrew and Latin.

Figure 1:
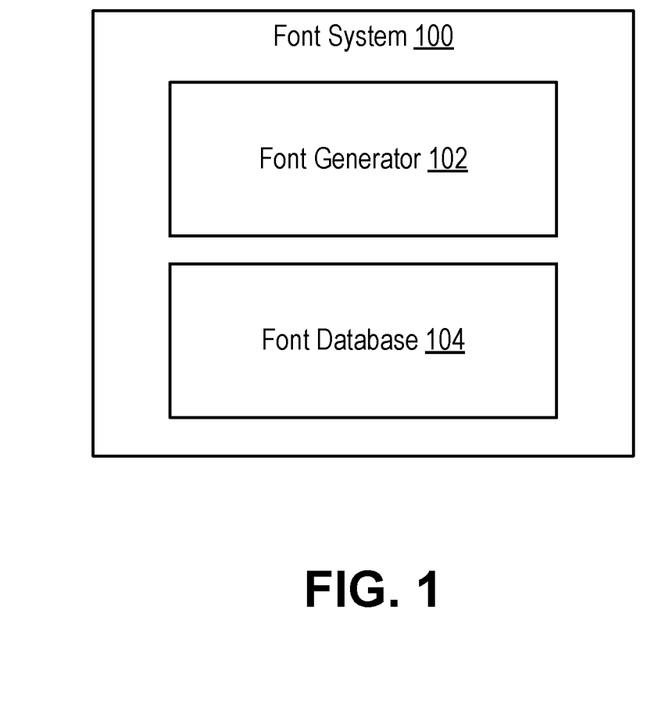
FIG. 1 illustrates a block diagram of an example font system, according to some implementations of the present disclosure.

FIG. 1 illustrates an example block diagram of a font system 100, according to some implementations. In an embodiment, the font system 100 enables toggling between a text view in which diacritic marks are displayed on a GUI and a text view in which diacritic marks are hidden. In an embodiment, the font system 100 is implemented by a computing system, such as the computer system 600 of FIG. 6. Note that the font system 100 is shown for illustration purposes only, as the font system 100 may include additional components or have one or more components removed without departing from the scope of the disclosure. Further, note that the various components of the font system may be arranged and connected in any manner.

As shown in FIG. 1, the font system 100 includes a font generator 102 and a font database 104. The font generator 102 is configured to generate one or more fonts. The generated fonts are stored in a memory of the font database 104. As described below, the font generator 102 can generate a diacritic conceal font, a diacritic reveal font, or both. The font system 100 can provide the generated font(s) to a user interface through which a user can select the generated font(s) for a text displayed on the user interface. In some embodiments, the font generator 102 uses workflow 200 of FIG. 2 to generate diacritic reveal and diacritic conceal fonts.

Figure 2:
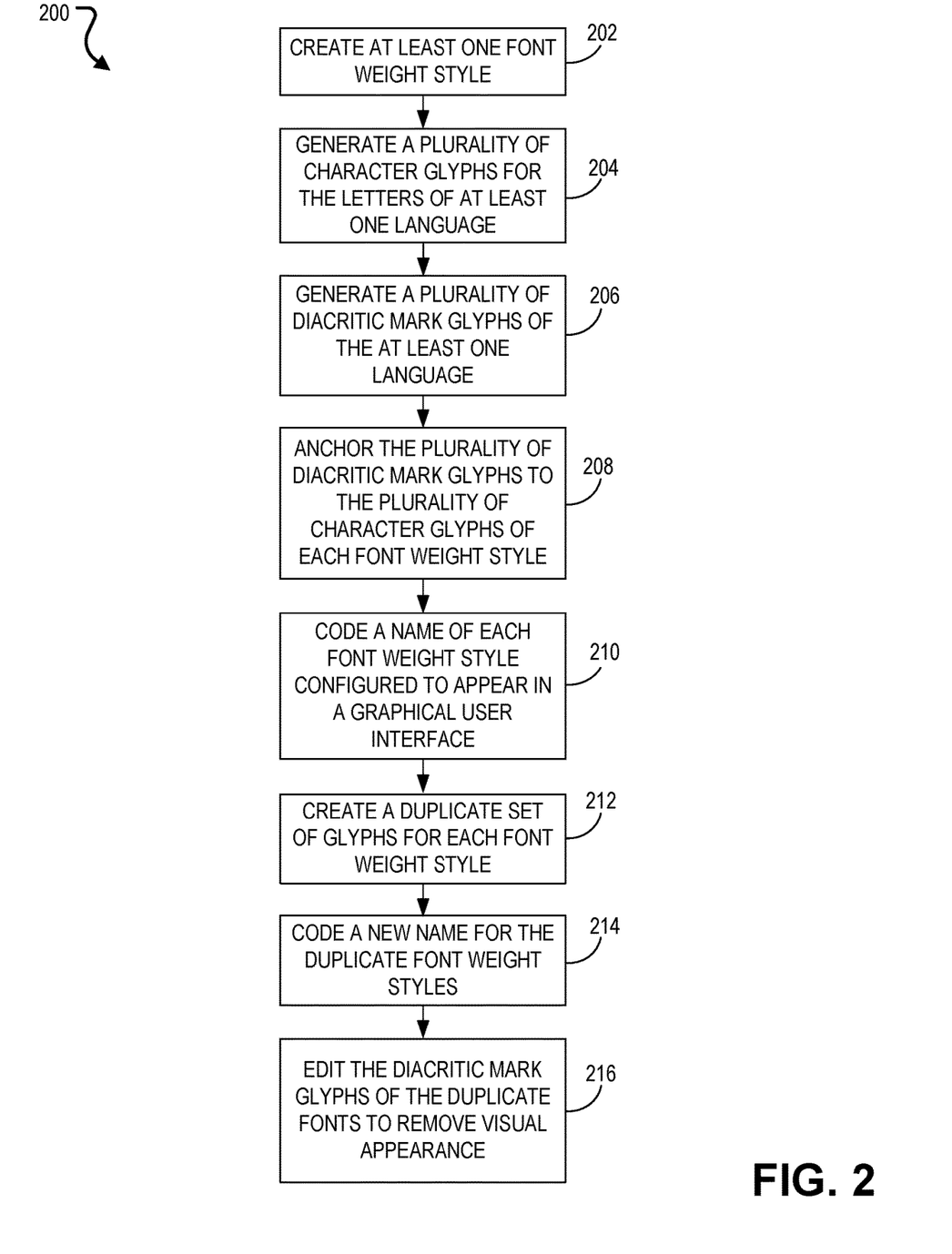
FIG. 2 illustrates an example workflow for generating diacritics-revealing and diacritics-concealing fonts, according to some implementations of the present disclosure.

FIG. 2 illustrates an example workflow 200 for generating diacritic reveal and diacritic conceal fonts, according to some implementations. For clarity of presentation, the description that follows generally describes the workflow 200 in the context of components in other figures of this description. For example, the workflow 200 can be performed by computer system 600 of FIG. 6. However, it will be understood that the workflow 200 can be performed, for example, by any suitable system, environment, software, hardware, or a combination of systems, environments, software, and hardware, as appropriate. In some implementations, various steps of the workflow 200 can be run in parallel, in combination, in loops, or in any order.

At step 202, the workflow 200 involves creating at least one font weight style. Font weight style refers to the thickness or thinness of the typeface of the font. Creating a font weight style involves generating a source file for the font weight style. Example font weight styles include a boldface or heavyweight font, a normal font, and a lightweight font. In an example, the number of font weight styles that are created is based on a user input or a predetermined configuration.

At step 204, the workflow 200 involves generating a plurality of character glyphs for the letters of at least one language. In one example, generating the plurality of character glyphs involves using a software glyph generator to generate the character glyphs. In another example, generating the plurality of character glyphs involves receiving a user input indicative of the designs of the plurality of character glyphs. In this example, a user designs and draws the plurality of character glyphs and provides the font generator 102 with the design of the character glyphs. Once the plurality of character glyphs are generated, step 204 further involves generating a set of character glyphs for each font weight style generated in step 202. The character glyphs for each font weight style can be generated by the font generator 102 or received as a user input.

At step 206, the workflow 200 involves generating a plurality of diacritic mark glyphs of the at least one language. In one example, generating the plurality of diacritic mark glyphs involves using a glyph generator to generate the plurality of diacritic mark glyphs. In another example, generating the plurality of diacritic mark glyphs involves receiving a user input indicative of the designs of the plurality of diacritic mark glyphs. In this example, a user designs and draws the plurality of diacritic mark glyphs and provides the font generator 102 with the design of the diacritic mark glyphs. Once the plurality of diacritic mark glyphs are generated, step 206 further involves generating a set of diacritic mark glyphs for font weight style generated in step 202. The diacritic mark glyphs for each font weight style can be generated by the font generator 102 or received as a user input.

At step 208, the workflow 200 involves anchoring the plurality of diacritic mark glyphs to the plurality of character glyphs of each generated font weight style. Anchoring a diacritic mark glyph to a character glyph involves associating the diacritic mark glyph with the character glyph, for example, in design and code. In examples where glyphs are generated for more than one language, the plurality of diacritic mark glyphs of each language are anchored with plurality of character glyphs of the same language. In some languages, such as Arabic, each diacritic mark can be added to each letter. In these languages, each diacritic mark glyph is anchored to each character glyph.

At step 210, the workflow 200 involves coding a name of each font weight style (which includes anchored diacritic mark glyphs) configured to appear in a GUI. Coding the name of a font weight style may involve editing the source file of the font weight style to change the name of the font weight style. For example, the name of the boldface font may set to "bold," the name of the regular font may set to "regular," and the name of the lightweight font may be set to "light."

At step 212, the workflow 200 involves generating a duplicate set of the generated glyphs (that is, both character and diacritic mark glyphs) for each font weight style. In one example, step 212 involves repeating steps 206-210 in order to generate the duplicate set of glyphs.

At step 214, the workflow 200 involves coding a new name for each duplicate font weight style. For example, the duplicate lightweight font may be named "light with hidden marks," the duplicate regular font may be named "regular with hidden marks," and the boldface font may be named "bold with hidden marks."

At step 216, the workflow 200 involves editing the diacritic mark glyphs of the duplicate set of glyphs to remove visual appearance. For example, a source file of the diacritic mark glyphs of the duplicate set of glyphs is edited to remove visual appearance. In some embodiments, the conceal font is configured to allow certain diacritic marks (for example, diacritic marks required for grammar) to appear in both conceal and reveal fonts. In these embodiments, the font generator 102 can determine the diacritic marks to appear in both conceal and reveal fonts. For example, the font generator 102 can receive a user input indicative of the diacritic marks to appear in both conceal and reveal fonts. The font generator 102 then edits all the duplicate diacritic mark glyphs (to remove visual appearance) except for those diacritic marks that are to appear in both conceal and reveal fonts.

Returning to FIG. 1, the font generator 102 stores the generated fonts in the font database 104. The font system 100 can provide the fonts stored in the font database 104 to a computer system (for example, computer system 600 of FIG. 6). The computing system can then provide an indication of the font to a user via a user interface. The user can provide a user input indicative of selection of one of the fonts for a text. In an example, selection of a reveal font for a text displays the diacritic marks associated with that text. Conversely, selection of a conceal font for the text suppresses the diacritic marks associated with that text.

Figure 3A:
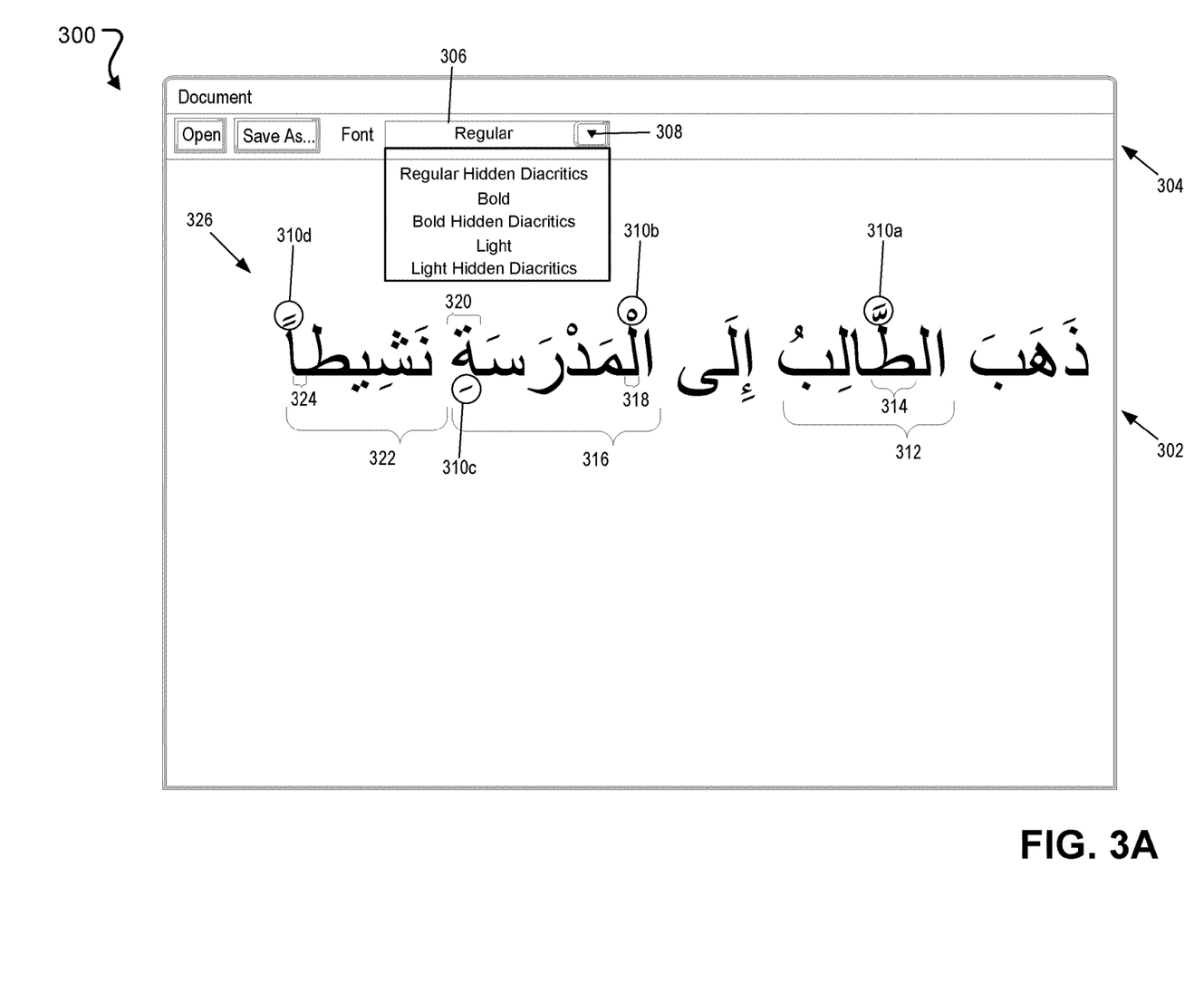
FIG. 3A, FIG. 3B, and FIG. 3C each illustrate an example graphical user interface (GUI) that provides generated diacritic fonts to a user of the interface, according to some implementations of the present disclosure.
Figure 3B:
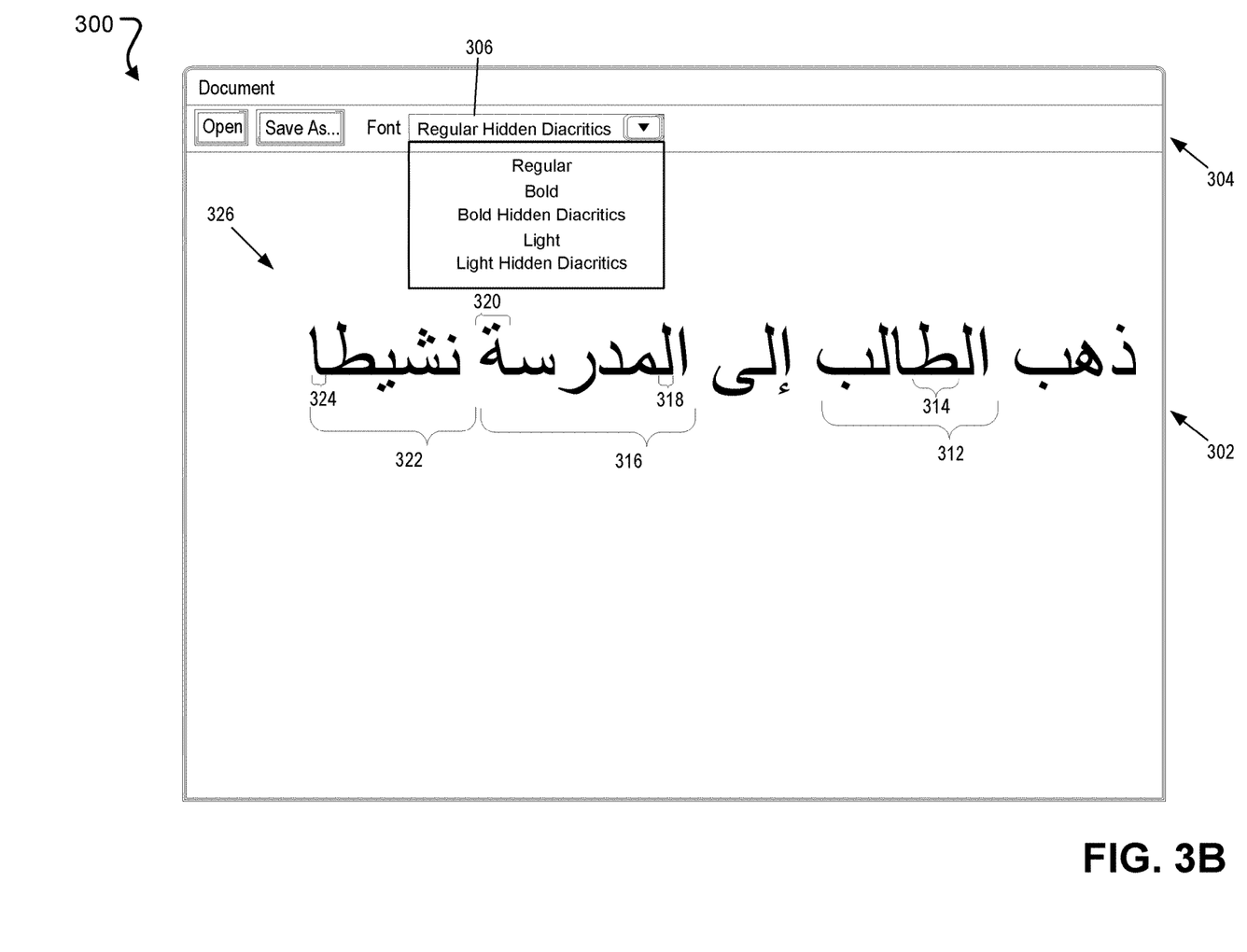
Figure 3C:
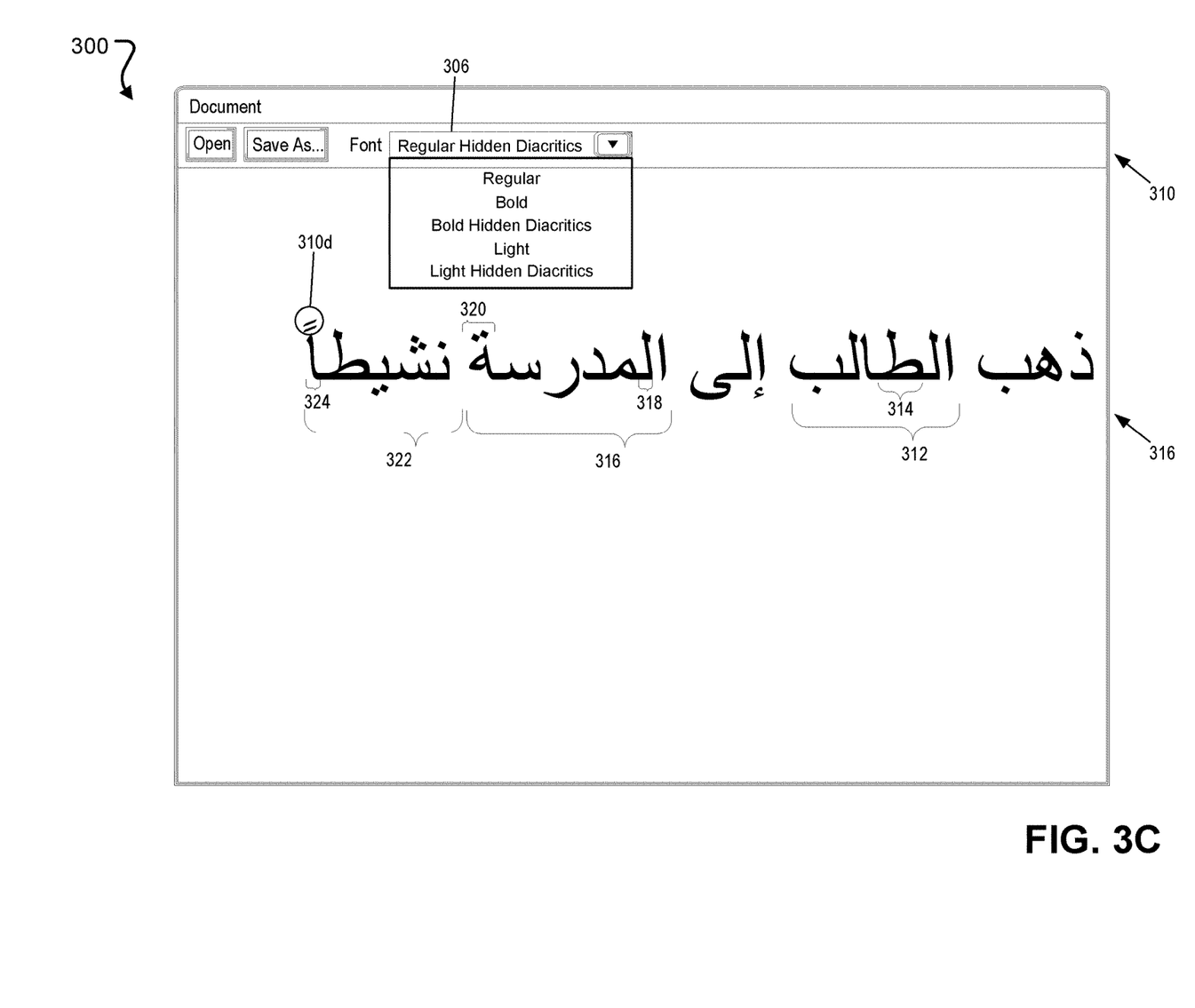

FIGS. 3A-3C illustrate an example graphical user interface (GUI) 300 that provides generated diacritic fonts to a user of the GUI, according to some implementations. The GUI 300 may be associated with any software application, such as a software text editor. As shown in FIGS. 3A-3C, the GUI 300 includes a primary window 302 that displays text and other software elements. Additionally, the GUI 300 includes a toolbar panel 304. The toolbar panel 304 includes drop-down menu 306, which can be accessed by clicking arrow button 308. The drop-down menu 306 enables selection of a font for the text displayed in the primary window 302. In the example of FIGS. 3A-3C, the fonts include three diacritic reveal fonts, each of which has a respective font weight style, and three diacritic conceal fonts, each of which also has a respective font weight style. The three diacritic reveal fonts are named "Regular," "Bold," and "Light." Selection of one of these reveal fonts for a text displays the diacritic marks associated with that text, albeit with different weight styles for each font. The three diacritic conceal fonts are named "Regular Hidden Diacritics," "Bold Hidden Diacritics," and "Light Hidden Diacritics." Selection of one of these conceal fonts for a text suppresses the diacritic marks associated with that text. To illustrate, consider the examples of FIGS. 3A-3C.

As shown in FIG. 3A, a text 326 is displayed in primary window 302. This text, which is in Arabic (a language that uses diacritic marks), includes several words, such as words 312, 316, and 322, that are comprised of Arabic letters, such as letters 314, 318, 320, and 324. Several letters in the text 326 have diacritic marks added to them. For example, letter 314 has a diacritic mark 310*a*, letter 318 has diacritic mark 310*b*, letter 320 has diacritic mark 310*c*, and letter 324 has diacritic mark 310*d*. Within examples, a diacritic conceal or reveal font can be selected for the text 326 in order to display or suppress the diacritic marks of the text. The selection can be based on a user input indicative of the selection or performed autonomously by the computing system in response to a trigger (for example, a desired complexity level of the text). In FIG. 3A, the font named "Regular," which is a diacritic reveal font, is selected. Thus, the diacritic marks of the text 326 are displayed.

In FIG. 3B, however, the font named "Regular Hidden Diacritics," which is a diacritic conceal font, is selected. Thus, the diacritic marks of the text 326 are suppressed. The conceal and reveal fonts do not affect the underlying text, and thus, it is possible to switch between the fonts in order to toggle between a text view in which diacritic marks are displayed and a text view in which diacritic marks are hidden. In an embodiment, the conceal font is configured to allow certain diacritic marks (for example, diacritic marks required for grammar) to appear in both conceal and reveal fonts. An example of this embodiment is illustrated in FIG. 3C. As shown in FIG. 3C, although the "Regular Hidden Diacritics" font is selected, diacritic marks 310a and 310d, which are configured to appear in both conceal and reveal fonts, are displayed.

In some embodiments, the font generator 102 can generate an OpenType stylistic set that enables toggling between a diacritic reveal view and a diacritic conceal view. The font generator 102 can generate the stylistic set in addition to or as an alternative to the diacritic reveal and the diacritic conceal fonts. In an example, the font generator 102 generates a stylistic set called "Hidden Diacritics" that conceals the diacritic marks of a text. This stylistic set is provided on user interfaces to enable users to toggle between a diacritic reveal view and a diacritic conceal view of texts. More specifically, selecting the Hidden Diacritics for a text conceals the diacritic marks for that text, and selecting a different stylistic set reveals the diacritic marks for that text.

In some embodiments, in a first step of generating a stylistic set, the font generator 102 generates a font (for example, as described in steps 202-210 of FIG. 2) or selects an existing font with which the stylistic set is associated. In a second step, the font generator 102 adds a stylistic set (for example, SS01) in the font. The stylistic set includes duplicate glyphs (for example, diacritic marks and characters) of the font. In a third step, the font generator 102 renames the stylistic font, for example, to "Hidden Diacritics." In a fourth step, the font generator 102 edits the diacritic mark glyphs of the stylistic set to remove visual appearance. The font generator 102 can then store the stylistic set in fonts 104.

Figure 6:
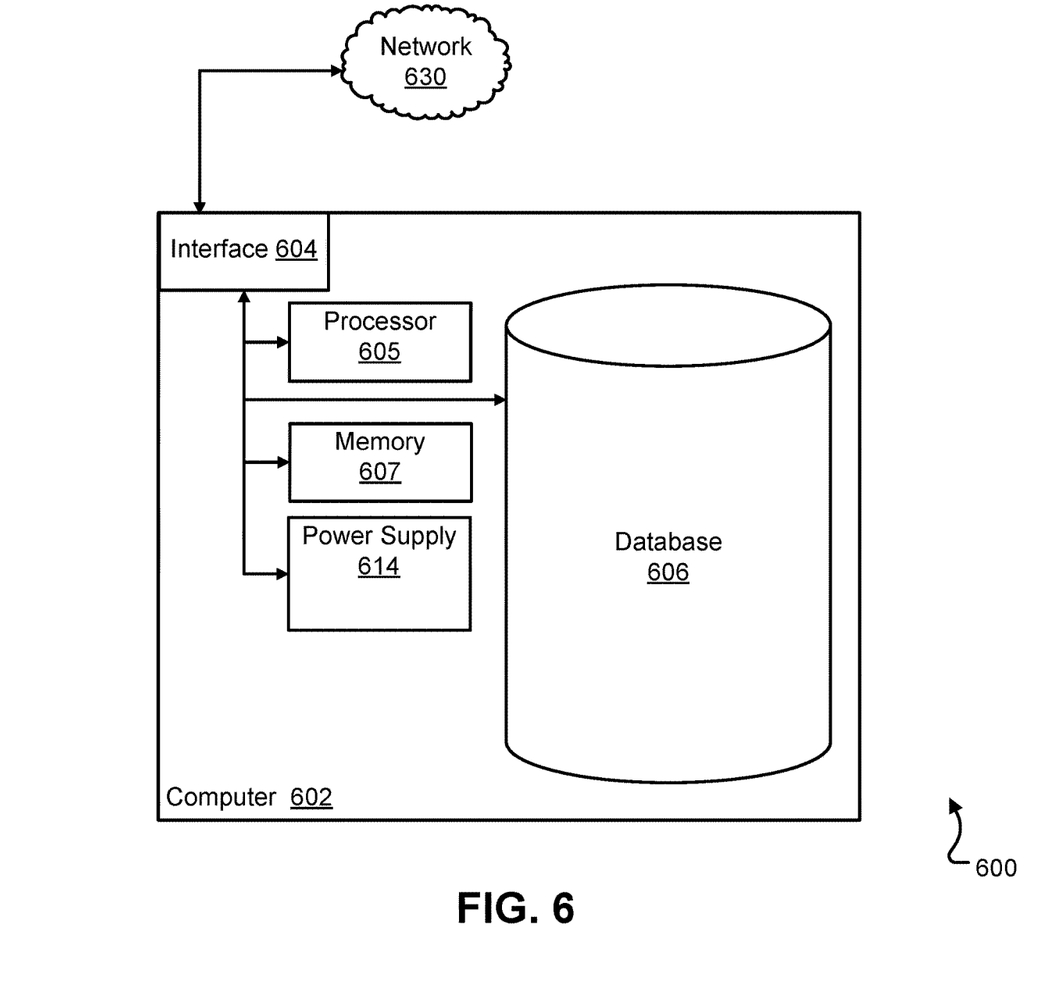
FIG. 6 illustrates a block diagram of an example computer system, according to some implementations of present disclosure.

The font system 100 can provide the stylistic set stored in the font database 104 to a computer system (for example, computer system 600 of FIG. 6). The computing system can then provide an indication of the stylistic set to a user via a user interface. The user can provide a user input indicative of turning the stylistic set on/off in order to toggle between a diacritic reveal view and a diacritic conceal view for a text. In some examples, like the font system, the stylistic set can be configured to allow certain diacritic marks (for example, diacritic marks required for grammar) to appear in the conceal diacritics stylistic set.

Figure 4:
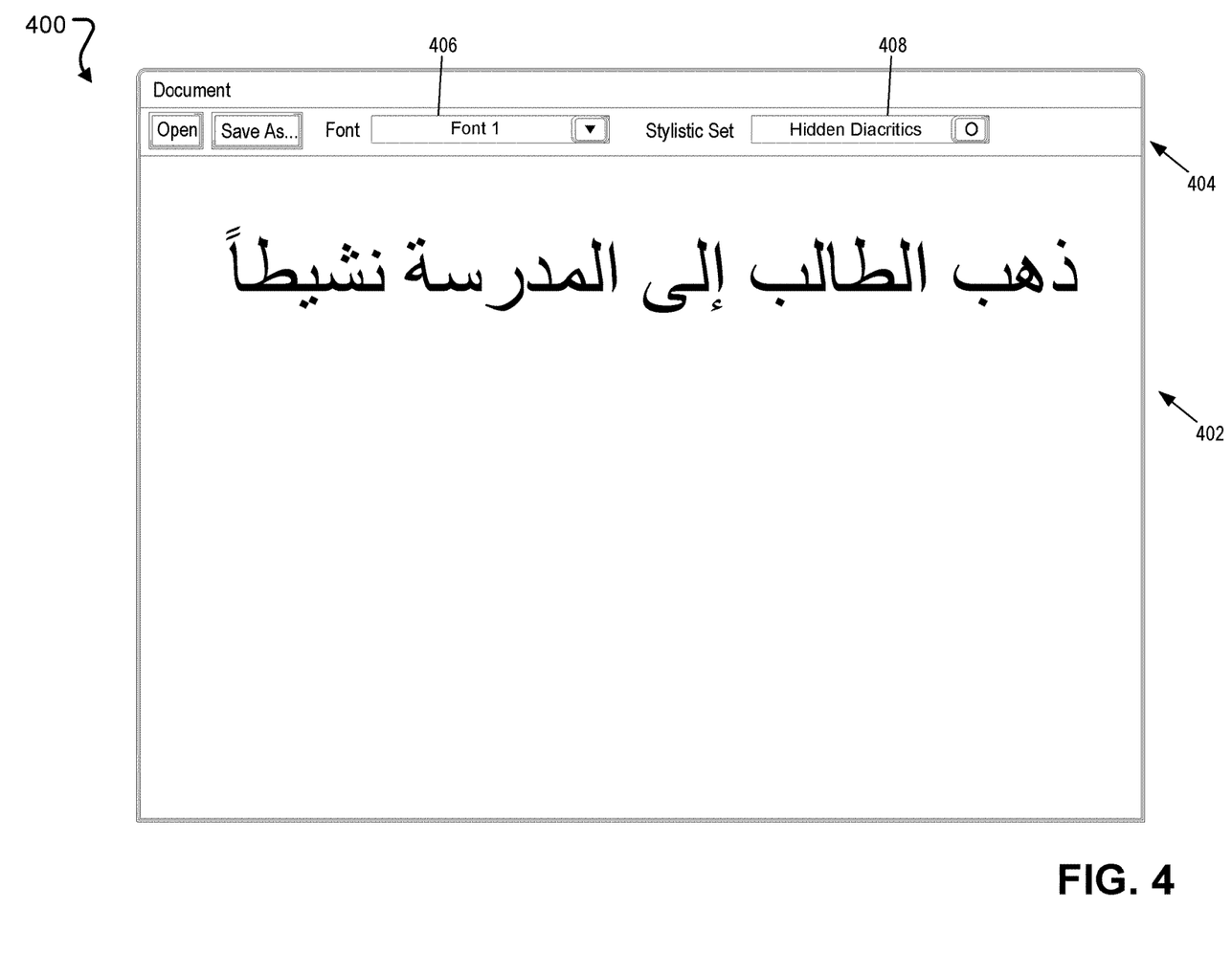
FIG. 4 illustrates an example graphical user interface (GUI) that provides generated stylistic set to a user of the interface, according to some implementations of the present disclosure.

FIG. 4 illustrates an example graphical user interface (GUI) 300 that provides a generated stylistic set to a user of the GUI, according to some implementations. The GUI 300 may be associated with any software application, such as a software text editor. As shown in FIG. 4, the GUI 400 includes a primary window 402 that displays text and other software elements. Additionally, the GUI 400 includes a toolbar panel 404. The toolbar panel 404 includes a menu 406 for selecting fonts for a text. The toolbar panel 404 also includes a graphical element 408 that enables selection/deselection of a stylistic set in connection with the selected font. In particular, the graphical element 408 can be used to turn the stylistic set on/off in order to toggle between a diacritic reveal view and a diacritic conceal view for a text.

Figure 5A:
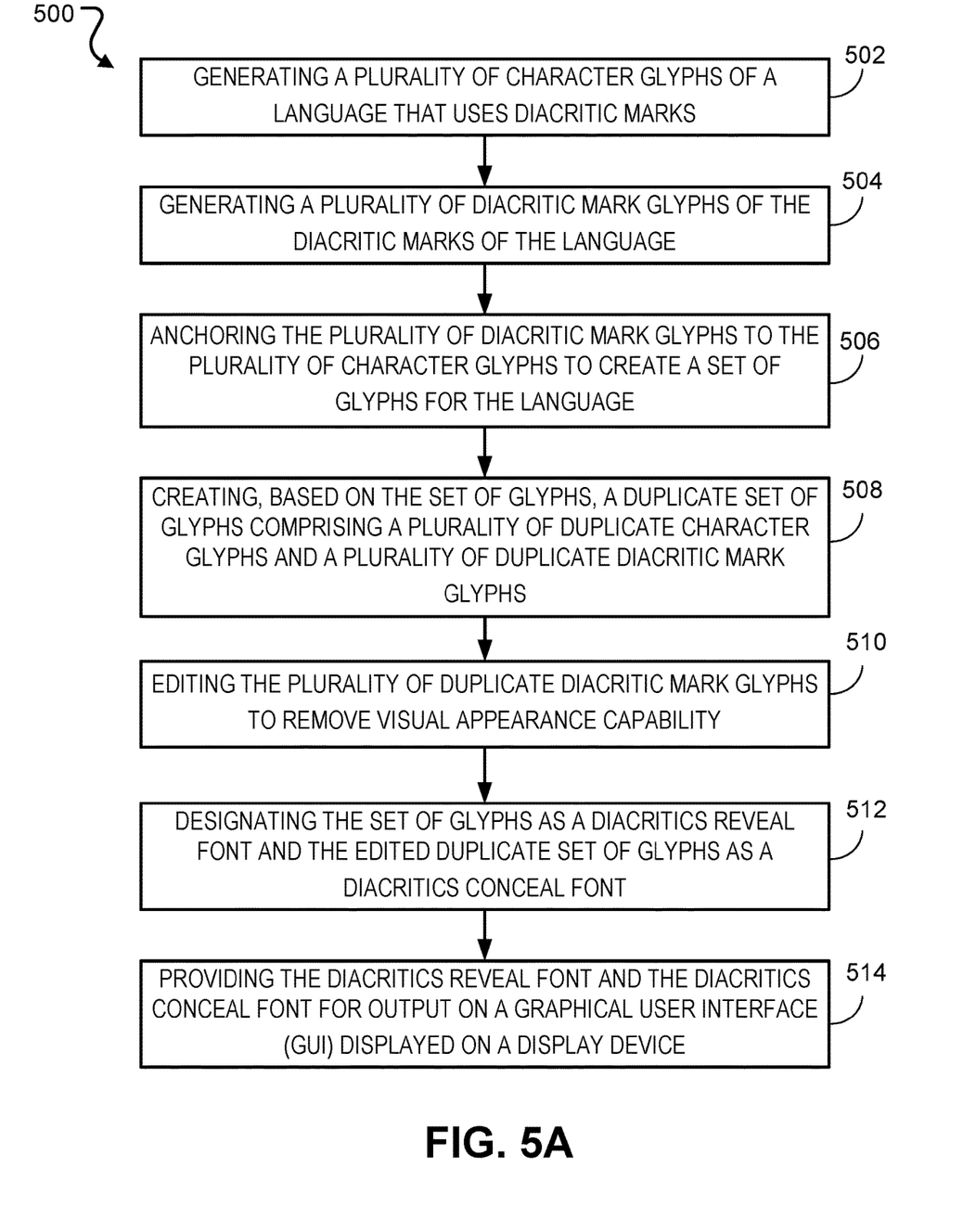
FIG. 5A illustrates a flowchart of an example method, according to some implementations of the present disclosure.

FIG. 5A is a flowchart of an example method 500, according to some implementations. The method 500 is for generating a diacritics reveal font and a diacritics conceal font, and for performing actions in connection with the generated fonts. For clarity of presentation, the description that follows generally describes method 500 in the context of the other figures in this description. However, it will be understood that method 500 can be performed, for example, by any suitable system, environment, software, hardware, or a combination of systems, environments, software, and hardware, as appropriate. In some implementations, various steps of method 500 can be run in parallel, in combination, in loops, or in any order.

At step 502, method 500 involves generating a plurality of character glyphs of a language that uses diacritic marks.

At step 504, method 500 involves generating a plurality of diacritic mark glyphs of the diacritic marks of the language.

At step 506, method 500 involves anchoring the plurality of diacritic mark glyphs to the plurality of character glyphs to create a set of glyphs for the language.

At step 508, method 500 involves creating, based on the set of glyphs, a duplicate set of glyphs comprising a plurality of duplicate character glyphs and a plurality of duplicate diacritic mark glyphs.

At step 510, method 500 involves editing at least one of the plurality of duplicate diacritic mark glyphs to remove visual appearance capability.

At step 512, method 500 involves designating the set of glyphs as a diacritics reveal font and the edited duplicate set of glyphs as a diacritics conceal font.

At step 514, method 500 involves providing the diacritics reveal font and the diacritics conceal font for output on a graphical user interface (GUI) displayed on a display device.

In some implementations, method 500 further involves generating a plurality of font weight styles for at least one of the diacritics reveal font and the diacritics conceal font; and providing the plurality of font weight styles for output on the GUI.

In some implementations, method 500 further involves coding respective names for each of the diacritics reveal font and the diacritics conceal font.

In some implementations, the GUI includes a font menu that includes the respective names of the diacritics reveal font and the diacritics conceal font.

In some implementations, method 500 further involves receiving a user input indicating selection of one of the diacritics reveal font and the diacritics conceal font for a text displayed on the GUI, where the text includes diacritic marks.

In some implementations, the selection is of the diacritics conceal font, and the display of the diacritic marks of the text are suppressed on the GUI.

In some implementations, the selection is of the diacritics conceal font, the user input is a first user input, and method 500 further involves receiving a second user input indicating selection of the diacritics reveal font, where the diacritic marks of the text are revealed on the GUI.

In some implementations, editing at least one of the plurality of duplicate diacritic mark glyphs to remove visual appearance capability involves editing code of source files of the plurality of duplicate diacritic mark glyphs to remove visual appearance capability.

In some implementations, editing at least one of the plurality of duplicate diacritic mark glyphs to remove visual appearance capability involves identifying at least one diacritic mark that is preconfigured to appear in both the diacritics reveal font and the diacritics conceal font; and editing the plurality of duplicate diacritic mark glyphs other than the diacritic mark glyphs that are associated with the at least one diacritic mark that is preconfigured to appear in both the diacritics reveal font and the diacritics conceal font.

Figure 5B:
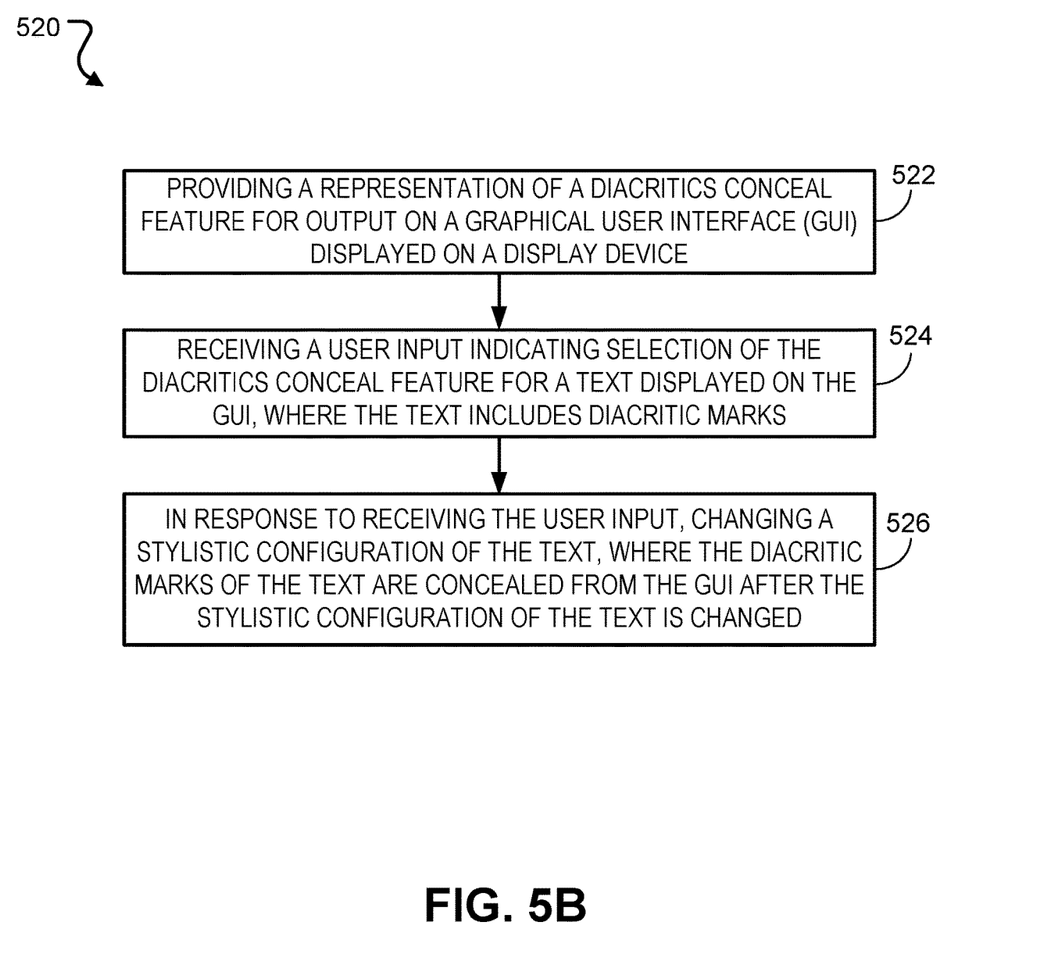
FIG. 5B illustrates a flowchart of another example method, according to some implementations of the present disclosure.

FIG. 5B is a flowchart of an example method 520, according to some implementations. For clarity of presentation, the description that follows generally describes method 520 in the context of the other figures in this description. However, it will be understood that method 500 can be performed, for example, by any suitable system, environment, software, hardware, or a combination of systems, environments, software, and hardware, as appropriate. In some implementations, various steps of method 500 can be run in parallel, in combination, in loops, or in any order.

At step 522, method 520 involves providing a representation of a diacritics conceal feature for output on a graphical user interface (GUI) displayed on a display device.

At step 524, method 520 involves receiving a user input indicating selection of the diacritics conceal feature for a text displayed on the GUI, where the text includes diacritic marks.

At step 526, method 520 involves, in response to receiving the user input, changing a stylistic configuration of the text, where the diacritic marks of the text are concealed from the GUI after the stylistic configuration of the text is changed.

In some implementations, the diacritics conceal feature is a diacritics conceal font, and the stylistic configuration of the text is a font of the text.

In some implementations, the diacritics conceal feature is a diacritics conceal stylistic set, and the stylistic configuration of the text is a stylistic set of a font of the text.

In some implementations, the user input is a first user input, and method 520 further involves: receiving a second user input indicating selection of a diacritics reveal feature for the text displayed on the GUI; and in response to receiving the second user input, changing the stylistic configuration of the text, where the diacritic marks of the text are displayed on the GUI after the stylistic configuration of the text is changed.

In some implementations, the GUI includes a font menu that includes a representation of a diacritics reveal font and a diacritics conceal font.

In some implementations, the GUI includes a menu that includes a representation of a diacritics conceal stylistic set.

FIG. 6 is a block diagram of an example computer system 600 that can be used to provide computational functionalities associated with described algorithms, methods, functions, processes, flows, and procedures described in the present disclosure, according to some implementations of the present disclosure. In some implementations, the font system 100 can be the computer system 600, include the computer system 600, or include part of the computer system 600. In some implementations, the font system 100 can communicate with the computer system 600.

The illustrated computer 602 is intended to encompass any computing device such as a server, a desktop computer, embedded computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI). In some implementations, the inputs and outputs include display ports (such as DVI-I+2x display ports), USB 3.0, GbE ports, isolated DI/O, SATA-III (6.0 Gb/s) ports, mPCIe slots, a combination of these, or other ports. In instances of an edge gateway, the computer 602 can include a Smart Embedded Management Agent (SEMA), such as a built-in ADLINK SEMA 2.2, and a video sync technology, such as Quick Sync Video technology supported by ADLINK MSDK+. In some examples, the computer 602 can include the MXE-5400 Series processor-based fanless embedded computer by ADLINK, though the computer 602 can take other forms or include other components.

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a high level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus. In some implementations, any or all of the components of the computer 602, including hardware or software components, can interface with each other or the interface 604 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 602 and other components (whether illustrated or not) that are communicably coupled to the computer 602. The functionality of the computer 602 can be accessible for all service consumers using this service layer. Software services, such as those provided by the service layer, can provide reusable, defined functionalities through a defined interface. For example, the interface can be software written in JAVA, C++, or a language providing data in extensible markup language (XML) format. While illustrated as an integrated component of the computer 602, in alternative implementations, the API or the service layer can be stand-alone components in relation to other components of the computer 602 and other components communicably coupled to the computer 602. Moreover, any or all parts of the API or the service layer can be implemented as child or sub-modules of another software module, enterprise application, or hardware module without departing from the scope of the present disclosure.

The computer 602 can include an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 can also include a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

An application can be an algorithmic software engine providing functionality according to particular needs, desires, or particular implementations of the computer 602 and the described functionality. For example, an application can serve as one or more components, modules, or applications. Multiple applications can be implemented on the computer 602. Each application can be internal or external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power-supply 614 can include a power plug to allow the computer 602 to be plugged into a wall socket or a power source to, for example, power the computer 602 or recharge a rechargeable battery.

There can be any number of computers 602 associated with, or external to, a computer system including computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
   generating a plurality of character glyphs of a language that uses diacritic marks;
   generating a plurality of diacritic mark glyphs of the diacritic marks of the language;
   anchoring the plurality of diacritic mark glyphs to the plurality of character glyphs to create a set of glyphs for the language;
   creating, based on the set of glyphs, a duplicate set of glyphs comprising a plurality of duplicate character glyphs and a plurality of duplicate diacritic mark glyphs;
   identifying at least one diacritic mark that is preconfigured to appear in both the diacritics reveal font and the diacritics conceal font;
   editing code of source files of the plurality of duplicate diacritic m ark glyphs other than the diacritic mark glyphs that are associated with the at least one diacritic mark that is preconfigured to appear in both the diacritics reveal font and the diacritics conceal font to remove visual appearance capability;
   designating the set of glyphs as a diacritics reveal font and the edited duplicate set of glyphs as a diacritics conceal font;
   coding respective names for each of the diacritics reveal font and the diacritics conceal font;
   generating a plurality of font weight styles for at least one of the diacritics reveal font and the diacritics conceal font; and
   providing a font menu on a graphical user interface (GUI) displayed on a display device, wherein the font menu includes: (i) respective representations of the diacritics reveal font and the diacritics conceal font that enable toggling between a text view in which a plurality of diacritic marks are displayed and a text view in which the plurality of diacritic marks are hidden, and (ii) the plurality of font weight styles.

2. The computer-implemented method of claim 1, the method further comprising:
   receiving a user input indicating selection of one of the diacritics reveal font and the diacritics conceal font for a text displayed on the GUI, wherein the text includes diacritic marks.

3. The computer-implemented method of claim 2, wherein the selection is of the diacritics conceal font, and wherein display of the diacritic marks of the text are suppressed on the GUI.

4. The computer-implemented method of claim 2, wherein the selection is of the diacritics conceal font, wherein the user input is a first user input, and wherein the method further comprises:
- receiving a second user input indicating selection of the diacritics reveal font, wherein the diacritic marks of the text are revealed on the GUI.

5. A system, comprising:
one or more processors configured to perform operations comprising:
- generating a plurality of character glyphs of a language that uses diacritic marks;
- generating a plurality of diacritic mark glyphs of the diacritic marks of the language;
- anchoring the plurality of diacritic mark glyphs to the plurality of character glyphs to create a set of glyphs for the language;
- creating, based on the set of glyphs, a duplicate set of glyphs comprising a plurality of duplicate character glyphs and a plurality of duplicate diacritic mark glyphs;
- identifying at least one diacritic mark that is preconfigured to appear in both the diacritics reveal font and the diacritics conceal font;
- editing code of source files of the plurality of duplicate diacritic mark glyphs other than the diacritic mark glyphs that are associated with the at least one diacritic mark that is preconfigured to appear in both the diacritics reveal font and the diacritics conceal font to remove visual appearance capability;
- designating the set of glyphs as a diacritics reveal font and the edited duplicate set of glyphs as a diacritics conceal font;
- coding respective names for each of the diacritics reveal font and the diacritics conceal font;
- generating a plurality of font weight styles for at least one of the diacritics reveal font and the diacritics conceal font; and
- providing a font menu on a graphical user interface (GUI) displayed on a display device, wherein the font menu includes: (i) respective representations of the diacritics reveal font and the diacritics conceal font that enable toggling between a text view in which a plurality of diacritic marks are displayed and a text view in which the plurality of diacritic marks are hidden, and (ii) the plurality of font weight styles.

6. The system of claim 5, the operations further comprising:
- receiving a user input indicating selection of one of the diacritics reveal font and the diacritics conceal font for a text displayed on the GUI, wherein the text includes diacritic marks.

7. The system of claim 6, wherein the selection is of the diacritics conceal font, and wherein display of the diacritic marks of the text are suppressed on the GUI.

8. The system of claim 6, wherein the selection is of the diacritics conceal font, wherein the user input is a first user input, and wherein the operations further comprise:
- receiving a second user input indicating selection of the diacritics reveal font, wherein the diacritic marks of the text are revealed on the GUI.

9. A non-transitory computer-readable storage medium coupled to one or more processors and storing programming instructions for execution by the one or more processors, the programming instructions instructing the one or more processors to perform operations comprising:
- generating a plurality of character glyphs of a language that uses diacritic marks;
- generating a plurality of diacritic mark glyphs of the diacritic marks of the language;
- anchoring the plurality of diacritic mark glyphs to the plurality of character glyphs to create a set of glyphs for the language;
- creating, based on the set of glyphs, a duplicate set of glyphs comprising a plurality of duplicate character glyphs and a plurality of duplicate diacritic mark glyphs;
- identifying at least one diacritic mark that is preconfigured to appear in both the diacritics reveal font and the diacritics conceal font;
- editing code of source files of the plurality of duplicate diacritic mark glyphs other than the diacritic mark glyphs that are associated with the at least one diacritic mark that is preconfigured to appear in both the diacritics reveal font and the diacritics conceal font to remove visual appearance capability;
- designating the set of glyphs as a diacritics reveal font and the edited duplicate set of glyphs as a diacritics conceal font;
- coding respective names for each of the diacritics reveal font and the diacritics conceal font;
- generating a plurality of font weight styles for at least one of the diacritics reveal font and the diacritics conceal font; and
- providing a font menu on a graphical user interface (GUI) displayed on a display device, wherein the font menu includes: (i) respective representations of the diacritics reveal font and the diacritics conceal font that enable toggling between a text view in which a plurality of diacritic marks are displayed and a text view in which the plurality of diacritic marks are hidden, and (ii) the plurality of font weight styles.

10. The non-transitory computer-readable storage medium of claim 9, the operations further comprising:
- receiving a user input indicating selection of one of the diacritics reveal font and the diacritics conceal font for a text displayed on the GUI, wherein the text includes diacritic marks.

11. The non-transitory computer-readable storage medium of claim 10, wherein the selection is of the diacritics conceal font, and wherein display of the diacritic marks of the text are suppressed on the GUI.

12. The non-transitory computer-readable storage medium of claim 10, wherein the selection is of the diacritics conceal font, wherein the user input is a first user input, and wherein the operations further comprise:
- receiving a second user input indicating selection of the diacritics reveal font, wherein the diacritic marks of the text are revealed on the GUI.

\* \* \* \* \*